United States Patent
Lee et al.

(10) Patent No.: US 10,793,671 B2
(45) Date of Patent: Oct. 6, 2020

(54) ALIPHATIC POLYCARBONATE MACROPOLYOL AND ALIPHATIC POLYCARBONATE-COAROMATIC POLYESTER MACROPOLYOL

(71) Applicant: LOTTE CHEMICAL CORPORATION, Seoul (KR)

(72) Inventors: Bun Yeoul Lee, Suwon (KR); Jong Yeob Jeon, Hongseong-gun (KR); Ji Hae Park, Hwaseong (KR); Jung Jae Lee, Suwon (KR); Eun Yeong Hwang, Suwon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 33 days.

(21) Appl. No.: 15/891,642

(22) Filed: Feb. 8, 2018

(65) Prior Publication Data
US 2018/0186929 A1    Jul. 5, 2018

Related U.S. Application Data

(62) Division of application No. 14/909,568, filed as application No. PCT/KR2013/009222 on Oct. 16, 2013, now abandoned.

(30) Foreign Application Priority Data

Aug. 13, 2013 (KR) .................. 10-2013-0096100

(51) Int. Cl.
| | |
|---|---|
| C08G 64/42 | (2006.01) |
| C08G 64/02 | (2006.01) |
| C08G 64/30 | (2006.01) |
| C09D 175/06 | (2006.01) |
| C08G 18/44 | (2006.01) |
| C08G 63/64 | (2006.01) |
| C08G 63/78 | (2006.01) |

(52) U.S. Cl.
CPC .......... C08G 64/0208 (2013.01); C08G 18/44 (2013.01); C08G 63/64 (2013.01); C08G 63/78 (2013.01); C08G 64/305 (2013.01); C08G 64/42 (2013.01); C09D 175/06 (2013.01)

(58) Field of Classification Search
None
See application file for complete search history.

(56) References Cited

U.S. PATENT DOCUMENTS

| | | | | |
|---|---|---|---|---|
| 5,143,997 A | * | 9/1992 | Endo .................. | C08F 299/024 522/135 |
| 5,171,830 A | * | 12/1992 | Grey .................... | C08G 64/305 521/25 |
| 6,255,437 B1 | * | 7/2001 | Walker ................. | A61H 9/0078 528/196 |
| 2008/0167430 A1 | | 7/2008 | Bruchmann et al. | |
| 2010/0261852 A1 | * | 10/2010 | Masubuchi ........ | C08G 18/0895 525/454 |

FOREIGN PATENT DOCUMENTS

| | | |
|---|---|---|
| CN | 1980979 A | 6/2007 |
| CN | 102241815 A | 11/2011 |
| EP | 0302712 A2 | 2/1989 |
| JP | 61272230 * | 12/1986 |
| JP | 1991220233 A | 9/1991 |
| JP | 3078644 B2 | 8/2000 |
| JP | 2002069166 A | 3/2002 |
| WO | WO2006002787 A1 | 1/2006 |
| WO | WO2009063768 A1 | 3/2011 |

OTHER PUBLICATIONS

Communication pursuant to Article 94(3) EPC, European Patent Office, dated Mar. 16, 2018, pp. 1-6, Rijswijk, Netherlands.
Jong Yeob Jeon et al, Preparation of Macrodiols and Polyols by Chopping High-Molecular-Weight Aliphatic Polycarbonates, Polymer Chemistry, Mar. 17, 2014, pp. 1570-1580, vol. 52, Journal of Polymer Science, John Wiley & Sons, Inc, Hoboken, USA.

* cited by examiner

Primary Examiner — David J Buttner
(74) Attorney, Agent, or Firm — STIP Law Group, LLC

(57) ABSTRACT

Provided is an aliphatic polycarbonate macropolyol including —OAO— and $Z(O-)_a$ as repeating units. In the aliphatic polycarbonate macropolyol, the repeating units —OAO— and $Z(O-)_a$ are linked to each other via carbonyl (—C(O)—) linkers or are bonded to hydrogen to form terminal —OH groups. The number of moles of the terminal —OH groups is from aZ to aZ+0.2Z (where Z represents the number of moles of the repeating unit $Z(O-)_a$. Further provided is an aliphatic polycarbonate-co-aromatic polyester macropolyol including —OAO— and $Z(O-)_a$ as repeating units. In the aliphatic polycarbonate-co-aromatic polyester macropolyol, the repeating units —OAO— and $Z(O-)_a$ are linked via carbonyl (—C(O)—) and —C(O)YC(O)— as linkers or are bonded to hydrogen to form terminal —OH groups.

9 Claims, 3 Drawing Sheets

[Fig. 1]
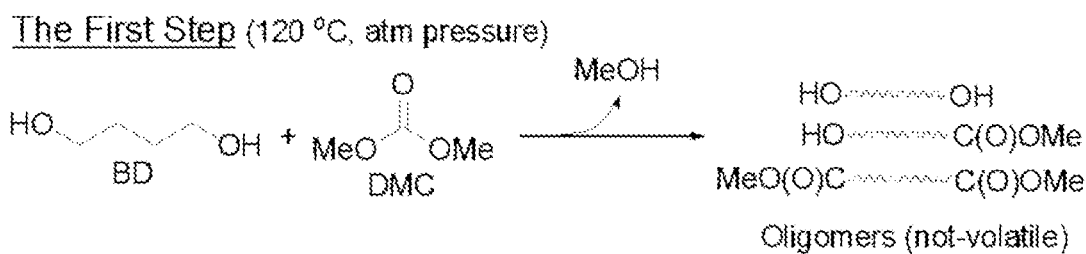
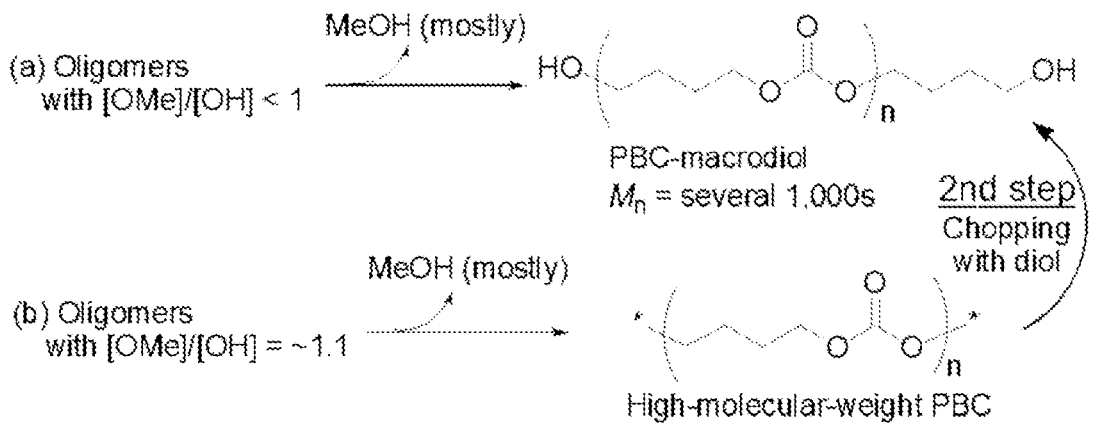

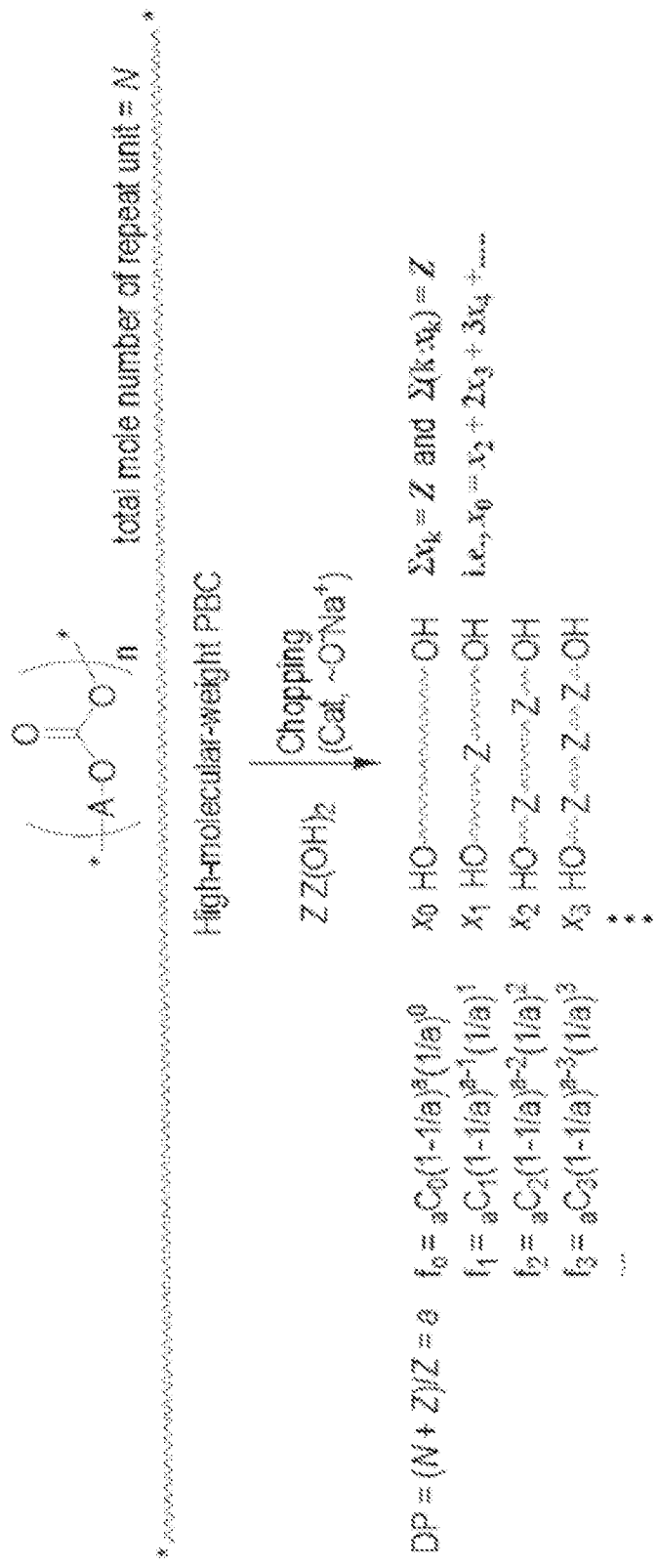
[Fig. 2]

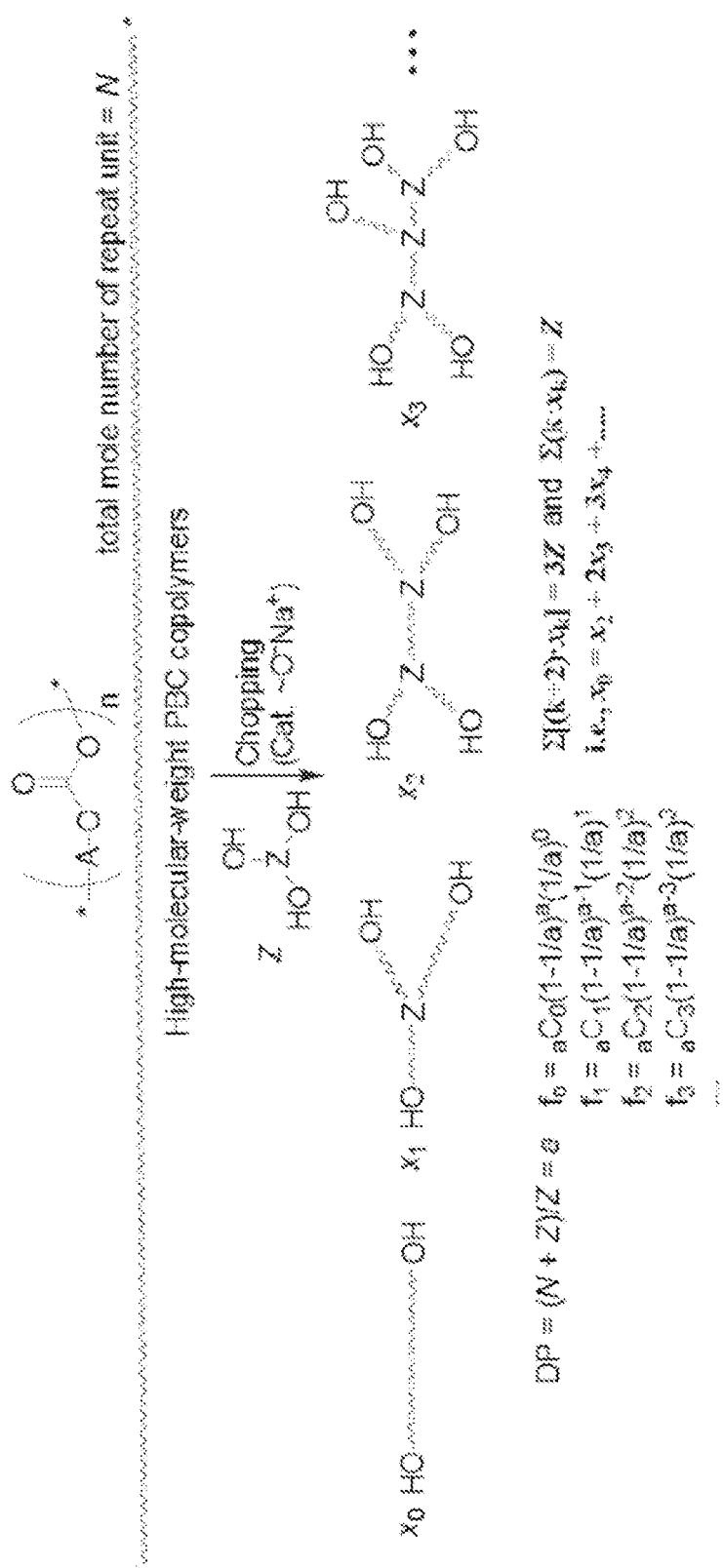
[Fig. 3]

“ALIPHATIC POLYCARBONATE MACROPOLYOL AND ALIPHATIC POLYCARBONATE-COAROMATIC POLYESTER MACROPOLYOL

CROSS-REFERENCE TO RELATED APPLICATIONS

This application is a Division of application Ser. No. 14/909,568 filed on Feb. 2, 2016 now abandoned which in turn claims the benefit of International Application No. PCT/KR2013/009222 filed on Oct. 16, 2013, which in turn claims the benefit of Korean Patent Application No. 10-2013-0096100 filed on Aug. 13, 2013, the disclosures of which are incorporated by reference into the present application.

TECHNICAL FIELD

The present invention relates to an aliphatic polycarbonate macropolyol, an aliphatic polycarbonate-co-aromatic polyester macropolyol, and methods for producing the macropolyols. More specifically, the present invention relates to an aliphatic polycarbonate-co-aromatic polyester macropolyol that can be utilized as a polyurethane raw material, a coating material, a lubricating agent, etc., and a method for producing the macropolyol.

BACKGROUND ART

Aliphatic polycarbonates are biodegradable eco-friendly polymers. The most suitable process for the mass production of aliphatic polycarbonates is the condensation of dimethyl carbonate (DMC) with diols. DMC have been produced from toxic phosgene. Efforts have been made to develop processes for the production of DMC using carbon monoxide or more environmentally friendly carbon dioxide instead of phosgene. The use of carbon monoxide or carbon dioxide enables the production of DMC on a large scale at low cost. There are many reports in the literature on the condensation reactions of DMC and diols. However, the condensation reactions are slow and have limitations in obtaining high-molecular-weight polymers. Under these circumstances, oligomeric macrodiols having molecular weights on the order of several thousands and terminal —OH groups are currently produced and only small amounts thereof are used as polyurethane raw materials.

Approximately 10 million tons of polyurethane is produced globally every year. Polyurethane can find application in thermoplastic plastics, thermosetting plastics, elastomers, and the like. Most macropolyols having terminal —OH groups for polyurethane production are polyether-based compounds obtained via ring-opening polymerization of ethylene oxide or propylene oxide. Some aliphatic polyester-diols and -polyols are also used for polyurethane production. Aliphatic polycarbonate-diols and -polyols are used in relatively very small amounts but are known to have good hydrolysis resistance and be highly resistant to degradation by light and oxygen (EP 302712).

DETAILED DESCRIPTION OF THE INVENTION

Problems to be Solved by the Invention

An object of the present invention is to provide an aliphatic polycarbonate macropolyol, an aliphatic polycarbonate-co-aromatic polyester macropolyol, and methods for producing the macropolyols.

One aspect of the present invention provides an aliphatic polycarbonate macropolyol including —OAO— and $Z(O-)_a$ as repeating units in which the repeating units —OAO— and $Z(O-)_a$ are linked to each other via carbonyl (—C(O)—) linkers or are bonded to hydrogen to form terminal —OH groups and the number of moles of the terminal —OH groups is from $aZ$ to $aZ+0.2Z$ (where Z represents the number of moles of the repeating unit $Z(O-)_a$) wherein A is a substituted or unsubstituted $C_3$-$C_{60}$ alkylene or a combination of two or more substituted or unsubstituted $C_3$-$C_{60}$ alkylenes, a is an integer from 2 to 4, provided that when a is 2, Z is a substituted or unsubstituted $C_3$-$C_{60}$ alkanediyl, when a is 3, Z is a substituted or unsubstituted $C_3$-$C_{60}$ alkanetriyl, and when a is 4, Z is a substituted or unsubstituted $C_4$-$C_{60}$ alkanetetriyl.

As used herein, the term "macrodiol" refers to a linear polymer whose ends are all capped with —OH and whose degree of polymerization is from 5 to 25. The term "macropolyol" refers to include the macrodiol and a branched polymer whose ends are all capped with —OH and whose degree of polymerization is from 5 to 25. Therefore, unless otherwise mentioned, the term "macropolyol" is intended to include the macrodiol.

The term "alkyl" used herein is intended to include straight chained, branched, and cyclic hydrocarbon radicals. The term "alkylene" refers to a divalent radical derived from alkyl. For example, the alkylene includes methylene, ethylene, isobutylene, cyclohexylene, cyclopentylethylene, 2-prophenylene, and 3-butynylene. The main chain of the alkylene may be interrupted by —O— or phenylene. The term "substituted" in the expression of "substituted or unsubstituted" described herein means that one or more hydrogen atoms in the hydrocarbon are each independently replaced by the same or different substituents. Suitable substituents include, but are not limited to, $—R^a$, -halo, $—O^-$, $=O$, $—OR^b$, $—SR^b$, $—S^-$, $=S$, $—NR^cR^c$, $=NR^b$, $=N—OR^b$, trihalomethyl, $—CF_3$, $—CN$, $—OCN$, $—SCN$, $—NO$, $—NO_2$, $=N_2$, $—N_3$, $—S(O)_2R^b$, $—S(O)_2NR^b$, $—S(O)_2O^-$, $—S(O)_2OR^b$, $—OS(O)_2R^b$, $—OS(O)_2O^-$, $—OS(O)_2OR^b$, $—P(O)(O^-)_2$, $—P(O)(OR^b)(O^-)$, $—P(O)(OR^b)(OR^b)$, $—C(O)R^b$, $—C(S)R^b$, $—C(NR^b)R^b$, $—C(O)O^-$, $—C(O)OR^b$, $—C(S)OR^b$, $—C(O)NR^cR^c$, $—C(NR^b)NR^cR^c$, $—OC(O)R^b$, $—OC(S)R^b$, $—OC(O)O^-$, $—OC(O)OR^b$, $—OC(S)OR^b$, $—NR^bC(O)R^b$, $—NR^bC(S)R^b$, $—NR^bC(O)O^-$, $—NR^bC(O)OR^b$, $—NR^bC(S)OR^b$, $—NR^bC(O)NR^cR^c$, $—NR^bC(NR^b)R^b$, and $—NR^bC(NR^b)NR^cR^c$, where $R^a$ is selected from the group consisting of alkyl, cycloalkyl, heteroalkyl, cycloheteroalkyl, aryl, arylalkyl, heteroaryl, and heteroarylalkyl groups; each $R^b$ is independently hydrogen or $R^a$; each $R^c$ is independently $R^b$, with the proviso that the two $R^c$ groups, together with the nitrogen atom to which they are attached, may form a 4-, 5-, 6- or 7-membered cycloheteroalkyl and may optionally include 1 to 4 identical or different additional heteroatoms selected from the group consisting of O, N, and S. As a specific example, $—NR^cR^c$ is meant to include —NH$_2$, —NH-alkyl, N-pyrrolidinyl, and N-morpholinyl. As another example, the substituted alkyl is meant to include -alkylene-O-alkyl, -alkylene-heteroaryl, -alkylene-cycloheteroalkyl, -alkylene-C(O)OR$^b$, -alkylene-C(O)NR$^b$R$^b$, and —CH$_2$—CH$_2$—C(O)—CH$_3$. The one or more substituents, together with the atoms to which they are attached, may optionally form cyclic rings including cycloalkyl and cycloheteroalkyl.

FIG. 1 compares a conventional method for producing an aliphatic polycarbonate macrodiol with a method for producing an aliphatic polycarbonate macrodiol according to the present invention. According to the method of the present invention, an aliphatic polycarbonate macropolyol is produced by condensing HOAOH as a diol with DMC in the presence of a base catalyst while removing methanol to prepare an aliphatic polycarbonate with a number average molecular weight of 10000 or higher (first step) and transesterifying the high-molecular-weight condensation product with a diol, triol or tetraol compound $Z(OH)_a$ (where a is an integer from 2 to 4) (second step). In the second step, the transesterification occurs in the presence of the catalyst used in the first step according to the mechanism depicted in Reaction Scheme 1 and proceeds rapidly at a condensation temperature of 180 to 190° C. to reach equilibrium in a few hours. The equilibrium indicates that the repeating units —OAO— and $Z(O—)_a$ shown in Reaction Scheme 1 are randomly distributed in or between the polymer chains.

the total number of moles of —OH groups in the $Z(OH)_2$ initially added in the second step is the same as the number of —OH groups in the final macrodiol (that is, $\Sigma x_k = Z$). The number of moles of the $Z(OH)_2$ added should be identical to that of the $Z(O—)_2$ units included in the final macrodiol (that is, $\Sigma k \cdot x_k = Z$). From both equations, $f_0 = f_2 + 2f_3 + 3f_{04} + \ldots$ is derived. This equation is satisfied when the $f_k$ values obtained in Examples 1-9 are substituted thereinto.

In the second step, $Z(OH)_3$ as a triol compound may be added as a chopping agent for transesterification. As a result of the reaction, a macropolyol is obtained in which the repeating units —OAO— and $Z(O—)_3$ are randomly distributed in or between the polymer chains. The statistical distribution of the chains of the macropolyol can also be inferred in the same manner as in the macrodiol (FIG. 3).

(Reaction Scheme 1)

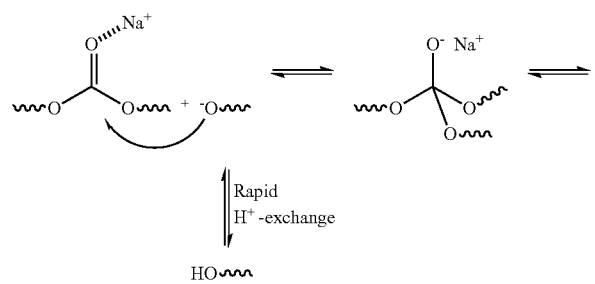
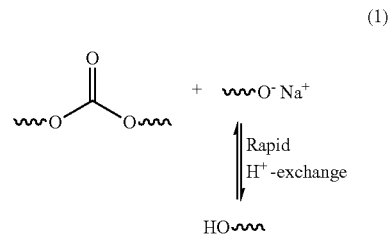

(1)

FIG. 2 shows the distribution of the chains of the macrodiol in which the repeating units —OAO— and $Z(O—)_2$ are randomly distributed, after transesterification with the diol compound $Z(OH)_2$ as a chopping material in the second step. The degree of polymerization (DP) of the final macrodiol is calculated by dividing the total number of moles $N+Z$ of the repeating units —OAO— and $Z(O—)_2$ by the sum of the number of moles of the polymer chains formed in the first step and the number of moles Z of the diol compound $Z(OH)_2$ added in the second step. When the polymer prepared in the first step has a sufficiently high molecular weight, the number of moles N/n of the polymer chains formed in the first step is insignificant and negligible compared to the number of moles Z of the diol compound $Z(OH)_2$ added in the second step, and as a result, the DP can be defined as $(N+Z)/Z$. From a statistical viewpoint, the probability $f_k$ of the number of chains including $kZ(O—)_2$ repeating units is represented by ${}_aC_k(1-1/a)^{a-k}(1/a)^k$ when the DP is expressed as a natural number a close to $(N+Z)/Z$. For example, the $f_k$ values of macrodiols produced in Examples 1-9 can be calculated as follows. High-molecular-weight aliphatic polycarbonates were prepared in yields of about 90% from 111 mmol of HOAOH. Thus, N is about 100. 16.7 mmol of $Z(OH)_2$ was added as a chopping agent in the second step. Thus, DP (i.e. a) is calculated to be about 7 ((100+16.7)/16.7). In this case, the probability $f_0$ of the number of chains having none of the $Z(O—)_2$ units, the probability $f_1$ of the number of chains having one $Z(O—)_2$ unit, the probability $f_2$ of the number of chains having two $Z(O—)_2$ units, the probability $f_3$ of the number of chains having three $Z(O—)_2$ units, and the probability $f_4$ of the number of chains having four $Z(O—)_2$ units are calculated to be 35%, 40%, 19%, 5.3%, and 0.9%, respectively. From another viewpoint, the total number of moles of —OH groups is maintained unchanged during chopping. That is, The present invention is based on a technique for producing a high-molecular-weight aliphatic polycarbonate in the presence of a base catalyst. The development of efficient techniques for producing aliphatic polycarbonates with molecular weights on the order of several tens of thousands is still in an early stage. The equations shown in FIGS. 2 and 3 are under the assumption that the DP of the polymer prepared in the first step is very high and the number of moles of the polymer chains before chopping is thus negligibly small compared to the number of moles Z of the $Z(OH)_2$ added in the second step. If the DP of the polymer prepared in the first step is not high, the number of moles of the polymer chains before chopping is not negligible compared to the number of moles Z of the chopping agent $Z(OH)_2$ added in the second step. The number of moles of the chains of the final macropolyol is the sum of the number of moles (i.e. N/n) of the chains of the polymer in the first step before chopping and the number of moles of the $Z(OH)_2$ added in the second step. This leads to an increase in the number $x_0$ of the chains having none of the $Z(O—)_a$ units in the final macropolyol by the number of moles of the chains of the polymer before chopping. Generally, macrodiol chains having none of the $Z(O—)_a$ units are highly crystalline, which renders the final product waxy or causes crystallization of the final product in an oil, making the final product suspended. Macropolyols in the form of waxes or suspended oils are not suitable for use as polyurethane raw materials, coating agents or lubricating agents. Another disadvantage is that the linear polymer chains cannot participate in cross-linking.

The present invention features in that since the polymer prepared in the first step before chopping has a sufficiently high molecular weight, the number of moles (that is, N/n in FIGS. 2 and 3) of the chains in the polymer is negligible (<10%) compared to the number of moles (that is, Z in FIGS. 2 and 3) of the chopping agent added in the second step. In this special situation, the following equations are derived:

1) the DP of a macropolyol produced by chopping a polymer having an infinite DP, $a=(Z+N)/Z$ 2) the DP of a macropolyol produced by chopping a polymer having a DP of n, $a'=(Z+N)/(Z+N/n)$ 3) when the number of moles N/n of polymer chains is one tenth of the number of moles Z of a chopping agent, that is, $N/n=(1/10)Z$, $a'=(Z+N)/(Z+N/n)=(Z+N)/(Z+0.1Z)=(10/11)a$ 4) when the number of moles N/n of polymer chains is one tenth of the number of moles Z of a chopping agent, that is, $N/n=(1/10)Z$, the relations $n=10(N/Z)=10(a-1)=10[(10/11)a'-1]$ are satisfied based on the equations 1) to 3).

The DP (i.e. a') of the macropolyol of interest is between 5 and 20 (see below). In the above equation, when a' is 5, n is 35. That is, the DP of the polymer before chopping is 7 times greater than that of the final macropolyol after chopping. When a' is 20, n is 171. That is, the DP of the polymer before chopping is about 8.5 times greater than that of the final macropolyol after chopping. In other words, when the DP of the polymer before chopping is at least 7 times greater than that of the final macropolyol after chopping, the number of moles (i.e. N/n in FIGS. 2 and 3) of the chains of the polymer prepared in the first step before chopping is negligible (<10%) compared to the number of moles (i.e. Z in FIGS. 2 and 3) of the chopping agent added in the second step. Assuming that the molecular weight of the chopping agent is roughly the same as that of the repeating unit of the polymer before chopping, the above relations are sufficiently satisfied when the molecular weight of the polymer before chopping is about 10-fold higher than that of the macropolyol after chopping. Referring to Tables 1-3 in the Examples section that follows, the molecular weights of the polymers before chopping were 10-fold higher than those of the macropolyols.

It is more desirable that the number of moles of the chains of the polymer before chopping is less than 5% with respect to the number of moles of the chopping agent. That is, when $N/n=(1/20)Z$, the relations $n=20(N/Z)=20(a-1)=10[(20/21)a'-1]$ are satisfied based on the above equations. When a' is 5, n is 75, which means that the DP of the polymer before chopping is 15 times greater than that of the final macropolyol after chopping. When a' is 20, n is 360, which means that the DP of the polymer before chopping is 18 times greater than that of the final macropolyol after chopping. Assuming that the molecular weight of the chopping agent is roughly the same as that of the repeating unit of the polymer before chopping, it is sufficient that the molecular weight of the polymer before chopping is about 20-fold or more higher than that of the final macropolyol after chopping. In the Examples section that follows, most of the polymers before chopping had at least 20-fold higher molecular weights than the macropolyols.

The ends of the final macropolyol produced by chopping the high-molecular-weight polymer with the $Z(OH)_a$ are mostly capped with —OH. This chopping is the feature of the present invention. If the molecular weight of the polymer before chopping is not sufficiently high, the number of moles of the end-capping groups included in the polymer is not negligible compared to that of —OH in the $Z(OH)_a$, and as a result, a considerable number of the end-capping groups included in the polymer remain in the final macropolyol. In the first step, the condensation reaction of DMC with HOAOH as a diol affords an aliphatic polycarbonate end-capped with —OH and —C(O)OCH$_3$. In a state in which terminal —OH groups are present in an excessive amount, the condensation reaction is carried out while removing mostly the diol. However, the reaction rate is very slow and the yield is also low, making it difficult to obtain a high molecular weight of the polymer (see (a) of FIG. 1). Based on this condensation reaction, a method for directly producing a macropolyol was reported (EP0302712B1). According to this method, a large amount (1 mol %) of Na as a catalyst is added to promote the condensation reaction. Due to the considerable amount of the catalyst, the reaction product should be dissolved in methylene chloride and neutralized by washing with a dilute aqueous acid solution. Many attempts have been made to prepare high-molecular-weight polymers end-capped with excess —C(O)OCH$_3$ groups while removing DMC. However, after the molecular weights of the polymers increase to some extent, the reaction rates are greatly slowed down, leading to a limited increase in the molecular weight of the polymers. Based on this method, Sivaram et al. reported the preparation of polymers having weight average molecular weights of 6,000 to 8,000 by condensation of DMC with various diols (e.g., 1,4-butanediol, 1,6-hexanediol, 1,8-octanediol, and 1,4-bis(hydroxymethyl)cyclohexane) using 1,3-diphenoxytetra-n-butyldistannoxane as a catalyst (Polymer Vol. 36, 4851-4854, 1995). U.S. Pat. No. 5,171,830 discloses a process for the preparation of aliphatic polycarbonates whose molecular weights are on the order of 2,400 by condensing DMC with various diols using a tertiary amine or alkylammonium salt as a catalyst. According to a recent report, an attempt has been made to synthesize aliphatic polycarbonates by condensation of various diols and DMC using 1-n-butyl-3-methylimidazolium-2-carboxylate (1 mol %) as a catalyst (Polym. Chem., 2012, 3, 1475). However, the aliphatic polycarbonates have number average molecular weights not higher than 6,700. Chuncheng Li et al. reported the preparation of an aliphatic polycarbonate with a number average molecular weight of several tens of thousands by condensation of DMC and 1,4-butanediol using a $TiO_2/SiO_2$/poly (vinylpyrrolidone) mixture as a solid catalyst (*Polym Int* 2011; 60: 1060-1067; *Journal of Macromolecular Science, Part A: Pure and Applied Chemistry* (2011) 48, 583-594). These reported methods all require the removal of the catalysts by washing after the preparation of the polymers. Since the polymers prepared by the methods have terminal —C(O)OCH$_3$ groups in common, chopping of the polymers whose molecular weights are not considerably high leads to the production of macropolyols including a considerable number of terminal —C(O)OCH$_3$ groups, which are not suitable for use as polyurethane raw materials. In contrast, the method of the present invention features in that a polymer with a very high molecular weight is prepared from a diol and DMC in which —OH and —OCH$_3$ are present in a ratio of ~1:1, while removing mostly methanol and is then chopped into a macropolyol ((b) of FIG. 1). By chopping the high-molecular-weight polymer, the number of moles of the end-capping groups in the polymer before chopping can be greatly reduced to a negligible level, leading to the production of the macropolyol whose terminal groups are mostly —OH groups.

After complete dehydration of the diol monomer, oligomers are prepared in which —OH and —OCH$_3$ are present in a ratio of ~1:1, and are then subjected to condensation. This can considerably enhance the reaction rate. Thus, the high-molecular-weight aliphatic polycarbonate can be prepared in a short time even in the presence of a small amount of a base catalyst ((b) of FIG. 1). The condensation catalyst can be used for the subsequent chopping reaction without the need to be removed. The base catalyst may include a lithium, sodium, or potassium cation and may be used in an amount of 0.01 to 0.1 mol %, preferably 0.02 to 0.05 mol %, based on the HOAOH. The presence of an excess of the catalyst may have an adverse effect on the growth of molecular weight. As the reaction proceeds, the catalyst may be precipitated and may affect the physical properties of the final macrodiol and polyol. Meanwhile, the presence of the catalyst in an amount of less than 0.01 mol % does not contribute to an increase in reaction rate, making it difficult to prepare the high-molecular-weight polymer. Since HO-A-OH added after completion of the condensation is mostly incorporated into the polymer chains, there is no significant change between the molar ratio of the HOAOH to the catalyst initially added and the molar ratio of the —OAO— units to the catalyst in the final macropolyol.

The use of a small amount of the catalyst also avoids the need to remove the catalyst remaining after completion of the reaction. The initially added catalyst present in the final macropolyol is a salt composed of an alkali metal cation and an alkoxy anion of the end-capping group. Although the base catalyst remains unremoved or unneutralized, it does not change the final macropolyol at room temperature and can thus be utilized for polyurethane production without the need to be removed. As a result of reacting with dibutyltin dichloride or a tertiary amine hydrochloride salt, the catalyst may be converted to a dibutyltin compound or a tertiary amine, which is a typical catalyst for polyurethane production. The total amount of the base catalyst initially added may also be used for urethane production. Alternatively, a portion of the base catalyst may be neutralized and the remaining portion thereof may be utilized as a catalyst for polyurethane production. The base catalyst may be neutralized with melamine phenylphosphonate or an acyl halide.

Like the conventional method shown in (a) of FIG. 1, methods for directly producing aliphatic polycarbonate macropolyols are known in EP 302712, EP 2,036,937, and EP 798,328. However, the known methods are not suitable for the production of macropolyols by chopping high-molecular-weight polymers in which the number of moles of terminal —OH groups is from aZ to aZ+0.2Z (where Z represents the number of moles of $Z(O—)_a$ as a repeating unit), which is claimed in the present invention. According to the conventional method, the condensation reaction is carried out while removing by-produced methanol during the production of a macropolyol. However, DMC participating in the condensation reaction is distilled off together with methanol, making it difficult to control the molecular weight of the final product depending on the composition of the reactants initially added. In the case where a macropolyol is produced by condensation of HOAOH and $Z(OH)_a$ with DMC in accordance with the conventional method, the initial number of moles of —OH groups corresponds to the sum of the product of the number of moles Z of the $Z(OH)_a$ and a and the product of the number of moles of HOAOH and 2. As the condensation reaction proceeds, the number of moles of —OH decreases and approximates aZ. When the condensation reaction is allowed to proceed further, the number of moles of —OH decreases to below aZ. At this time, many branched polymer chains begin to cross-link with each other, resulting in a dramatic increase in molecular weight, and the condensation product is finally gelled. When the number of the terminal —OH groups reaches aZ to aZ+0.2Z, more preferably aZ+0.1Z, during the series of consecutive condensations, it is practically difficult to quench the reaction (see Comparative Example 1). The distributions of the chains of macropolyols produced by chopping through transesterification, which is the feature of the present invention, can be accurately predicted by statistical analysis (FIGS. 2 and 3), whereas the distributions of the chains of macropolyols directly produced by condensation are not easy to predict by statistical analysis.

Similarly to the method of the present invention, U.S. Pat. No. 5,143,997 issued on Sep. 1, 1992 discloses a method for producing a polycarbonate-polyol by transesterification of a polycarbonate-diol with trimethylolpropane as a triol compound or pentaerythritol as a tetraol compound. Before chopping, the macrodiol has a number average molecular weight as low as 2000 and is end-capped with —OH. That is, the macrodiol is produced by the method shown in (a) of FIG. 1 and is chopped into a macropolyol having a lower molecular weight ≤1000, which is suitable for use as a polyurethane raw material. Specifically, a poly(hexamethylene carbonate)-polyol having a number average molecular weight of 500 to 1000 is produced by transesterification of a poly(hexamethylene carbonate)-diol having a number average molecular weight of 2000 with trimethylol propane $(CH_3C(CH_2OH)_3)$ or pentaerythritol $(C(CH_2OH)_4)$ at 220° C. for 8 hours in the presence of tetrabutyl titanate $((nBuO)_4Ti)$ as a catalyst. The polycarbonate-diol before chopping is chopped with substantially the same number of moles of pentaerythritol $(C(CH_2OH)_4)$ as a chopping agent to produce a macropolyol having a molecular weight of 1000. At this time, the number of moles of terminal —OH groups is 4Z+2Z (where Z represents the number of moles of pentaerythritol), which is well outside the range (4Z+0.2Z) claimed in the present invention. In this case, a considerable number of polymer chains including only the unit —OAO— rather than the unit $Z(O—)_a$ are present in the macropolyol and are precipitated as crystals in the final product. This crystallization renders the final product waxy or suspended oily (Comparative Example 2). Transesterification of 1 mole of a polycarbonate-diol having a molecular weight of 2,000 with 4 moles of pentaerythritol gives a macropolyol having a molecular weight of 500. As in this case, the number of moles of terminal —OH groups is 4Z+0.5Z (where Z represents the number of moles of the pentaerythritol), which is well outside the range (4Z+0.2Z) claimed in the present invention. The method of the present invention is distinguished from the prior art in that a high-molecular-weight polymer is chopped into a macropolyol with a broad molecular weight distribution, the number of chopping agent-free chains in the final product is minimized, and the kind of a catalyst used is different.

Specifically, the present invention provides an aliphatic polycarbonate macrodiol wherein the HOAOH as a raw material for the repeating unit —OAO— is selected from the group consisting of Formulae 1a to 1c:

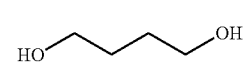

[Formula 1a]

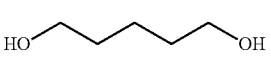

[Formula 1b]

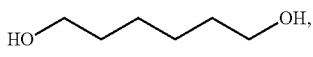

[Formula 1c]

the repeating unit $Z(O—)_a$ is $Z(O—)_2$ (i.e. a is 2), and the $Z(OH)_2$ as a raw material for the $Z(O—)_2$ is selected from the group consisting of Formulae 1d to 1h:

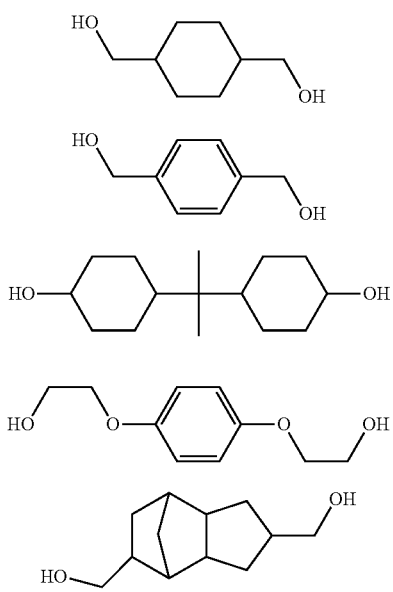

The diol compounds of Formulae 1a to 1h are currently prepared on a commercial scale and are in use.

More specifically, the HOAOH as a raw material for the repeating unit —OAO— is a mixture of 80 to 95 mol % of 1,4-butanediol represented by Formula 1a and 5 to 20 mol % of the diol compound represented by Formula 1b or 1c, and the Z(O—)$_2$ repeating units are present in an amount of 5 to 20 mol % with respect to the —OAO— repeating units. The use of 1,4-butanediol as the diol compound enables the production of the macropolyol in a highly economical manner due to its low price. 1,4-Butanediol is an important compound necessary for the production of biodegradable polymers. Additional factories for commercial production of 1,4-butanediol from coal have recently been built. Processes for producing 1,4-butanediol by biomass fermentation are currently under active development. However, the use of aliphatic polycarbonate-polyols based on 1,4-butanediol is still insufficient because polycarbonate-diols produced using 1,4-butanediol as a major component are highly crystalline, which renders the final products waxy. When a macropolyol is produced by the conventional condensation process shown in (a) of FIG. 1, methanol as a byproduct needs to be removed. However, it is difficult to selectively remove methanol due to the low boiling point and high polarity of 1,4-butanediol. Therefore, the condensation process shown in (a) of FIG. 1 is not suitable for the production of a macropolyol. For these reasons, the development of macropolyols using 1,4-butanediol as a major component is still unsatisfactory despite the low price of 1,4-butanediol. 1,6-Hexanediol is currently in use as a major raw material for aliphatic polycarbonate-diols but is expensive compared to 1,4-butanediol.

The molecular weight (i.e. DP) of the macropolyol produced by the method of the present invention varies depending on the amount of the chopping agent added. When the Z(O—)$_2$ repeating units are present in an amount of 5 mol % with respect to the —OAO— repeating units, the DP of the final macrodiol or macropolyol is 21 (=105/5). Meanwhile, when the Z(O—)$_2$ repeating units are present in an amount of 20 mol % with respect to the —OAO— repeating units, the DP of the final macrodiol or macropolyol is 6 (=120/20). Within this range, the final product is suitable for use as a polyurethane raw material, a coating material, a lubricating agent, etc.

An aliphatic polycarbonate-diol obtained by condensation of one of 1,6-hexanediol, 1,5-pentanediol and 1,4-butanediol with DMC is in the form of a crystalline solid. For this reason, the aliphatic polycarbonate-diol is undesirable as a polyurethane raw material (Journal of Applied Polymer Science, Vol. 111, 217-227 (2009)). Viscous macrodiols are commonly used as raw materials for polyurethane production. The raw materials are commonly obtained by condensing a mixture of two or more diols with DMC (EP 302712; US 2010/0292497 A1). In Examples 5, 6, 8, and 9 that follow, inexpensive 1,4-butanediol as a major component and 5 to 20 mol % of another diol were used to prepare high-molecular-weight aliphatic polycarbonates, which were then chopped with another diol Z(OH)$_2$ as a chopping agent to produce macrodiols in which three repeating units are present. The use of the diols increases the possibility that the final products may be viscous.

The present invention also provides a branched aliphatic polycarbonate macropolyol in which the HOAOH as a raw material for the repeating unit —OAO— is selected from the group consisting of Formulae 1a to 1h and the Z(OH)$_a$ as a raw material for the repeating unit Z(O—)$_a$ is selected from the group consisting of Formulae 2a to 2d:

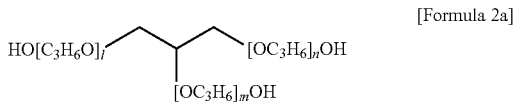

Mn ~260 (l+m+n = ~3)

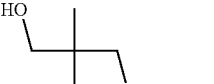

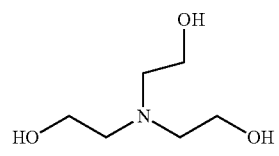

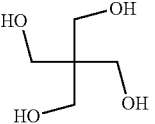

The branched macropolyol is cross-linkable during urethane production and can thus be used as an important raw material for a hard foam or a coating agent.

For the above-described reasons, aliphatic polycarbonate macropolyols are commercially attractive in which the HOAOH as a raw material for the repeating unit —OAO— is a mixture of 80 to 95 mol % of 1,4-butanediol and 5 to 20 mol % of the diol selected from the group consisting of Formulae 1b to 1h and the Z(O—)$_a$ repeating units are present in an amount of 5 to 20 mol % with respect to the —OAO— repeating units.

The chopping agent Z(OH)$_a$ of Formula 2a is the most commercially used compound. Chopping with this compound facilitates the production of viscous materials (Examples 22-35).

Another aspect of the present invention provides an aliphatic polycarbonate-co-aromatic polyester macropolyol including —OAO— and $Z(O-)_a$ as repeating units in which the repeating units —OAO— and $Z(O-)_a$ are linked via carbonyl (—C(O)—) and —C(O)YC(O)— as linkers or are bonded to hydrogen to form terminal —OH groups wherein A is a substituted or unsubstituted $C_3$-$C_{60}$ alkylene or a combination of two or more substituted or unsubstituted $C_3$-$C_{60}$ alkylenes, a is an integer from 2 to 4, provided that when a is 2, Z is a substituted or unsubstituted $C_3$-$C_{60}$ alkanediyl, when a is 3, Z is a substituted or unsubstituted $C_3$-$C_{60}$ alkanetriyl, and when a is 4, Z is a substituted or unsubstituted $C_4$-$C_{60}$ alkanetetriyl, and Y is a substituted or unsubstituted $C_5$-$C_{20}$ arylene, a combination of two or more substituted or unsubstituted $C_5$-$C_{20}$ arylenes, a substituted or unsubstituted $C_5$-$C_{20}$ heteroarylene or a combination of two or more substituted or unsubstituted $C_5$-$C_{20}$ heteroarylenes.

There are no reports on aliphatic polycarbonate-aromatic polyester copolymers in which —OAO— repeating units are randomly linked via carbonyl (—C(O)—) and —C(O)YC(O)—. The macropolyol of the present invention is produced by preparing a high-molecular-weight aliphatic polycarbonate in a manner similar to the conventional method, adding an aromatic diester to the aliphatic polycarbonate to prepare a random copolymer of the aliphatic polycarbonate and the aromatic polyester, and chopping the random copolymer with $Z(OH)_a$. The aliphatic polycarbonate-aromatic polyester macropolyol is a structurally new compound having the chain distributions analyzed in FIGS. 2 and 3.

The aliphatic polycarbonate-co-aromatic polyester macrodiol in which the HOAOH as a raw material for the repeating unit —OAO— is 1,4-butanediol, a in the repeating unit $Z(O-)_a$ is 2, the $Z(OH)_2$ as a raw material for the repeating unit $Z(O-)_2$ is selected from the group consisting of Formulae 1a to 1h, and the HOC(O)YC(O)OH as a raw material for the linker —C(O)YC(O)— is selected from phthalic acid, isophthalic acid, and terephthalic acid is commercially economical, taking into consideration the prices of the raw materials.

When the —C(O)YC(O)— linkers are present in an amount of 5 to 50 mol %, based on the —OAO— repeating units, the macropolyol is easy to synthesize. Meanwhile, when the $Z(O-)_2$ repeating units are present in an amount of 5 to 20 mol %, based on the —OAO— repeating units, the DP of the macropolyol is preferably in the range suitable for use in polyurethane, coatings, and lubricating agents.

The linker HOC(O)YC(O)OH as a raw material for the linker —C(O)YC(O)— is preferably isophthalic acid or terephthalic acid because a viscous form of the final product is easily obtained (Examples 37-39).

The macropolyol can be branched when the $Z(OH)_a$ as a raw material for the repeating unit $Z(O-)_a$ is selected from the group consisting of Formulae 2a to 2d. The branched macropolyol is suitable for use as a cross-linkable polyurethane raw material.

The present invention also provides a method for producing the aliphatic polycarbonate macropolyol. Specifically, the method of the present invention includes condensing HOAOH with DMC in the presence of a base catalyst while removing methanol to prepare an aliphatic polycarbonate with a number average molecular weight of 10000 or higher (first step) and transesterifying the condensation product with $Z(OH)_a$ (second step). In this connection, U.S. Pat. Nos. 5,143,997 and 8,344,092 describe methods in which an aliphatic polycarbonate-diol having a low molecular weight (Mn) of 2000 is chopped into a macropolyol having a lower molecular weight (Mn<1000) by transesterification with a triol or tetraol compound. These methods use tetraalkoxytitanium compounds as transesterification catalysts.

The method of the present invention is distinguished from the known methods in that the base catalyst used is simple. The method of the present invention has an advantage in that the catalyst used for the preparation of the high-molecular-weight aliphatic polycarbonate in the first step is used without the need to be removed instead of adding a new base catalyst. The method of the present invention is also distinguished from the known methods in that the aliphatic polycarbonate having a molecular weight of 10,000 or higher is subjected to a transesterification reaction. No particular restriction is imposed on the upper limit of the number average molecular weight of the aliphatic polycarbonate. For example, the aliphatic polycarbonate may have a number average molecular weight of 10000 to 200000, preferably 10000 to 100000.

The base catalyst is composed of a lithium, sodium or potassium cation and an alkoxy anion formed by deprotonation of the HO-A-OH. The base catalyst is used in an amount ranging from 0.01 mol % to 0.1 mol %, based on the HO-A-OH. The use of the base catalyst in the range defined above is economically desirable and is suitable for the preparation of the high-molecular-weight polymer in the first step.

The present invention also provides a method for producing an aliphatic polycarbonate-co-aromatic polyester macropolyol, including condensing HOAOH, DMC, and MeOC(O)YC(O)OMe in the presence of a base catalyst while removing methanol to prepare an aliphatic polycarbonate-co-aromatic polyester with a number average molecular weight of 10000 or higher (first step) and transesterifying the condensation product with $Z(OH)_a$ (second step).

Effects of the Invention

According to the methods of the present invention, an aliphatic polycarbonate or an aliphatic polycarbonate-co-aromatic polyester having a molecular weight of 10000 or higher is prepared and the high-molecular-weight polymer or copolymer is chain-chopped by transesterification with various alcohol compounds ($Z(OH)_a$) as chopping agents to produce macropolyols with lower molecular weights. The macropolyols have precisely controllable molecular weights and predictably unique polymer chain distributions. The macropolyols of the present invention feature in that the number of moles of terminal —OH groups is uniquely in the range of aZ to aZ+0.2Z (where Z represents the number of moles of the chopping agent $Z(OH)_a$. The chopping allows the macropolyols to have various structures and compositions, increasing the possibility that the macropolyols may be utilized as polyurethane raw materials, coating materials, lubricating agents, etc.

BRIEF DESCRIPTION OF THE DRAWINGS

FIG. 1 compares (a) a traditional method for producing an aliphatic polycarbonate macrodiol with (b) a method for producing an aliphatic polycarbonate macrodiol according to the present invention.

FIG. 2 shows the statistical distribution of chains of a macrodiol obtained using a diol as a chopping agent.

FIG. 3 shows the statistical distribution of chains of a macrodiol obtained using a triol as a chopping agent.

BEST MODE FOR CARRYING OUT THE INVENTION

The effects of the present invention will be explained in detail with reference to the following examples, including comparative examples. However, these examples are provided for illustrative purposes only and are not intended to limit the scope of the invention. Sodium was reacted with and dissolved in 1,4-butanediol, and then phthaloyl chloride was added thereto. The phthaloyl chloride was used in an amount of 0.25 equivalents per equivalent of the sodium. After stirring at 80° C. overnight, the mixture was distilled under a vacuum of 0.15 mmHg at 120° C. to obtain anhydrous 1,4-butanediol.

Examples 1-9: Condensation of Formula 1a (and Optionally Formula 1b or 1c) With DMC and Subsequent Chopping of the Condensation Product With One of Formulae 1b to 1h First step: 1,4-Butanediol (Formula 1a) and optionally 1,5-pentanediol (Formula 1b) or 1,6-hexanediol (Formula 1c) were placed in a 3-neck flask such that the total number of moles was 111 mmol. The 1,5-pentanediol or 1,6-hexanediol was used in the amount of 0 or 10 mol %, as shown in Table 1. NaH (0.056 mmol, 0.05 mol %) was added to the flask to form HO(CH$_2$)$_4$O$^-$Na$^+$ and then 15.7 g (174 mmol) of dimethyl carbonate (DMC) was added thereto. A mechanical stirrer was connected to one neck of the flask, a manifold attached with a vacuum line and a nitrogen line was connected to another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. The reaction was continued for a total of 3.5 h while removing volatiles at an elevated temperature of 190° C. and a reduced pressure of 570 mmHg for 0.5 h, 380 mmHg for 1 h, and 190 mmHg for 2 h. Thereafter, the reaction was allowed to proceed at 190° C. for additional 2 h while removing volatiles under a high vacuum of 0.3 mmHg, which was maintained using a vacuum pump.

Second step: A diol selected from Formulae 1b to 1h was used as a chopping agent. The chopping agent was added to the condensation product obtained in the first step. The chopping agent was used in an amount of 15 mol % (16.7 mmol), based on the diol(s) initially added. The reaction was carried out for 3 h while slowly cooling to 150° C. from 190° C. Within 10 min from the beginning of the reaction, a remarkable reduction in the viscosity of the reaction mixture was observed. As a result of the reaction, the condensation product was chopped with the chopping agent. The experimental results are summarized in Table 1.

TABLE 1

<Experimental results obtained when condensation product of Formula 1a (and optionally Formula 1b or 1c) and DMC was chopped with one of Formulae 1b to 1h>

| | HOAOH | Chopping agent, Z(OH)$_2$ (15 mol %) | Yield$^a$ (%) | Before chopping- M$_n$ (M$_w$/M$_n$)$^b$ | After chopping- M$_n$ (M$_w$/M$_n$)$^b$ | T$_g$ (° C.)$^c$ | State after 1 day | State after 7 days |
|---|---|---|---|---|---|---|---|---|
| Example 1 | 1a | 1b | 81 | 90000 (1.71) | 2400 (1.70) | −12 | Wax | Wax |
| Example 2 | 1a | 1c | 88 | 89000 (1.82) | 2000 (1.70) | −12 | Wax | Wax |
| Example 3 | 1a | 1d | 88 | 40000 (1.56) | 1800 (1.57) | −48 | Transparent oil | Slight suspension |
| Example 4 | 1a | 1e | 91 | 58000 (1.63) | 2000 (1.56) | −45 | Transparent oil | Wax |
| Example 5 | 1a + 1b (90:10) | 1e | 90 | 54000 (1.56) | 1900 (1.60) | −48 | Transparent oil | Transparent oil |
| Example 6 | 1a + 1c (90:10) | 1e | 83 | 66000 (1.62) | 1900 (1.60) | −49 | Transparent oil | Transparent oil |
| Example 7 | 1a + 1c (90:10) | 1f | 89 | 64000 (1.78) | 2000 (1.62) | −31 | Wax | Wax |
| Example 8 | 1a + 1c (90:10) | 1g | 91 | 79000 (1.59) | 2200 (1.65) | −40 | Orange oil | Orange oil |
| Example 9 | 1a + 1c (90:10) | 1h | 93 | 77000 (1.63) | 2200 (1.60) | −38 | Transparent oil | Transparent oil |

$^a$Value calculated from the actual mass of the obtained condensation product relative to the theoretical maximum mass of the condensation product.
$^b$Value measured on the basis of polystyrene standard in THF at 40° C. by GPC.
$^c$Glass transition temperature measured by DSC.

The results in Table 1 demonstrate the production of aliphatic polycarbonate macrodiols and show that the molecular weights of the condensation products were reduced to at least 1/10, more preferably 1/20, by chopping, which is the feature of the present invention, and most of the macrodiols were obtained in the form of oils (some thereof were in the form of waxes). Particularly, the oily macrodiols were readily obtained when the diols of Formula 1a and Formula 1b or 1c were used in combination rather than when the diol of Formula 1a was used alone as the HOAOH.

Examples 10-21: Condensation of Formula 1a (and Optionally Formula 1c) With DMC and Subsequent Chopping of the Condensation Product With One of Formulae 2a to 2d The first step of Examples 1-9 was repeated.

The second step of Examples 1-9 was repeated, except that a diol selected from Formulae 2a to 2d was used as a chopping agent. The experimental results are summarized in Table 2.

TABLE 2

<Experimental results obtained when condensation product of Formula 1a (and optionally Formula 1c) and dimethyl carbonate was chopped with one of Formulae 2a to 2d>

| | HOAOH | Chopping agent, $Z(OH)_a$ (15 mol %) | Yield[a] (%) | Before chopping- $M_n$ $(M_w/M_n)$[b] | After chopping- $M_n$ $(M_w/M_n)$[b] | $T_g$ (° C.)[c] | State after 1 day | State after 7 days |
|---|---|---|---|---|---|---|---|---|
| Example 10 | 1a | 2a | 81 | 69000 (1.62) | 2200 (1.81) | −49 | Wax | Wax |
| Example 11 | 1a | 2b | 86 | 43200 (1.58) | 2100 (1.96) | −45 | Wax | Wax |
| Example 12 | 1a | 2c | 85 | 49900 (1.54) | 2000 (1.84) | −57 | Wax | Wax |
| Example 13 | 1a | 2d | 82 | 50000 (1.61) | 1300 (1.71) | −41 | Wax | Wax |
| Example 14 | 1a + 1c (95:5) | 2a | 81 | 53000 (1.43) | 2100 (1.85) | −50 | Transparent oil | Wax |
| Example 15 | 1a + 1c (95:5) | 2b | 87 | 87000 (1.63) | 2200 (1.87) | −48 | Transparent oil | Suspended oil |
| Example 16 | 1a + 1c (95:5) | 2c | 84 | 50000 (1.72) | 1000 (1.31) | −69 | Yellow oil | Yellow Oil |
| Example 17 | 1a + 1c (95:5) | 2d | 89 | 39000 (1.58) | 2500 (1.93) | −44 | Transparent oil | Suspended oil |
| Example 18 | 1a + 1c (90:10) | 2a | 93 | 65000 (1.62) | 2300 (1.84) | −58 | Transparent oil | Transparent oil |
| Example 19 | 1a + 1c (90:10) | 2b | 85 | 50000 (1.53) | 2400 (1.83) | −51 | Transparent oil | Transparent oil |
| Example 20 | 1a + 1c (90:10) | 2c | 82 | 21200 (1.59) | 1800 (1.88) | −62 | Yellow oil | Yellow oil |
| Example 21 | 1a + 1c (90:10) | 2d | 73 | 50200 (1.73) | 1800 (1.75) | −48 | Suspended oil | Suspended oil |

[a]Value calculated from the actual mass of the obtained condensation product relative to the theoretical maximum mass of the condensation product.
[b]Value measured on the basis of polystyrene standard in THF at 40° C. by GPC.
[c]Glass transition temperature measured by DSC.

The results in Table 2 reveal that chopping of the high-molecular-weight aliphatic polycarbonates with the chopping agents of Formulae 2a to 2d led to the production of macropolyols with lower molecular weights. The polymers prepared in the first step before chopping were confirmed to have molecular weights at least 10 times (mostly at least 20 times) higher than those of the macropolyols produced after chopping, which is the feature of the present invention. The oily macropolyols were readily obtained when the diols of Formula 1a and Formula 1c were used in combination rather than when the diol of Formula 1a was used alone as the HOAOH.

Examples 22-35: Condensation of Formula 1a and One of Formulae 1b to 1h With DMC and Subsequent Chopping of the Condensation Product With Formula 2a First step: 1,4-Butanediol (Formula 1a) and an additional diol selected from Formulae 1b to 1h were placed in a 3-neck flask such that the total number of moles was 111 mmol. The additional diol was used in the amount of 5 mol % or 10 mol %, as shown in Table 1. NaH (0.056 mmol, 0.05 mol %) was added to the flask to form $HO(CH_2)_4O^-Na^+$ and then 15.7 g (174 mmol) of dimethyl carbonate (DMC) was added thereto. The subsequent procedure was carried out in the same manner as in Examples 1-9.

Second step: The triol of Formula 2a as a chopping agent was added to the condensation product obtained in the first step. The chopping agent was used in an amount of 15 mol % (4.43 g, 16.7 mmol), based on the diols initially added. The reaction was carried out for 3 h while slowly cooling to 150° C. from 190° C. Within 10 min from the beginning of the reaction, a remarkable reduction in the viscosity of the reaction mixture was observed. As a result of the reaction, the condensation product was chopped with the chopping agent. The experimental results are summarized in Table 3.

TABLE 3

<Experimental results obtained when condensation product of Formulae 1a, one of Formulae 1b to 1h, and dimethyl carbonate was chopped with Formula 2a>

| | HOAOH | Chopping agent, $Z(OH)_a$ (15 mol %) | Yield[a] (%) | Before chopping- $M_n$ $(M_w/M_n)$[b] | After chopping- $M_n$ $(M_w/M_n)$[b] | $T_g$ (° C.)[c] | State after 1 day | State after 7 days |
|---|---|---|---|---|---|---|---|---|
| Example 22 | 1a + 1b (95:5) | 2a | 85 | 64000 (1.55) | 2000 (1.74) | −44 | Suspended oil | Suspended oil |
| Example 23 | 1a + 1d (95:5) | 2a | 85 | 35000 (1.72) | 2000 (1.86) | −42 | Slight suspension | Slight suspension |
| Example 24 | 1a + 1e (95:5) | 2a | 83 | 38000 (1.58) | 2000 (1.71) | −46 | Suspended oil | Slight suspension |
| Example 25 | 1a + 1f (95:5) | 2a | 82 | 48000 (1.64) | 2000 (1.81) | −40 | Slight suspension | Slight suspension |
| Example 26 | 1a + 1g (95:5) | 2a | 83 | 45000 (1.56) | 2100 (1.86) | −41 | Slight suspension | Slight suspension |
| Example 27 | 1a + 1h (95:5) | 2a | 96 | 43000 (1.57) | 1900 (1.83) | −48 | Transparent oil | Transparent oil |
| Example 28 | 1a + 1b (90:10) | 2a | 85 | 85000 (1.45) | 2000 (1.79) | −46 | Transparent oil | Transparent oil |

TABLE 3-continued

<Experimental results obtained when condensation product of Formulae 1a, one of Formulae 1b to 1h, and dimethyl carbonate was chopped with Formula 2a>

|  | HOAOH | Chopping agent, $Z(OH)_a$ (15 mol %) | Yield[a] (%) | Before chopping- $M_n$ $(M_w/M_n)$[b] | After chopping- $M_n$ $(M_w/M_n)$[b] | $T_g$ (° C.)[c] | State after 1 day | State after 7 days |
|---|---|---|---|---|---|---|---|---|
| Example 29 | 1a + 1d (90:10) | 2a | 82 | 45000 (1.61) | 2200 (1.84) | −43 | Transparent oil | Transparent oil |
| Example 30 | 1a + 1e (90:10) | 2a | 85 | 51000 (1.51) | 2000 (1.75) | −38 | Transparent oil | Transparent oil |
| Example 31 | 1a + 1f (90:10) | 2a | 91 | 58000 (1.61) | 2100 (1.82) | −32 | Transparent oil | Transparent oil |
| Example 32 | 1a + 1g (90:10) | 2a | 82 | 44000 (1.56) | 1900 (1.80) | −36 | Slight suspension | Slight suspension |
| Example 33 | 1a + 1h (90:10) | 2a | 87 | 81000 (1.77) | 2100 (1.94) | −40 | Transparent oil | Transparent oil |
| Example 34 | 1a + 1b (90:10) | 2a (5 mol %) | 87 | 60000 (1.40) | 4500 (1.83) | −46 | Wax | Wax |
| Example 35 | 1a + 1b (90:10) | 2a (10 mol %) | 85 | 87000 (1.50) | 3200 (1.58) | −43 | Wax | Wax |

[a]Value calculated from the actual mass of the obtained condensation product relative to the theoretical maximum mass of the condensation product.
[b]Value measured on the basis of polystyrene standard in THF at 40° C. by GPC.
[c]Glass transition temperature measured by DSC.

The results in Table 3 show that most of the macropolyols produced by chopping the high-molecular-weight aliphatic polycarbonates, which were prepared using 1,4-butanediol as a major raw material, with Formula 2a as a chopping agent were in the form of oils. All polymers prepared in the first step before chopping were confirmed to have molecular weights at least 10 times (mostly at least 20 times) higher than those of the macropolyols produced after chopping.

Examples 36-39: Condensation of Formula 1a, DMC, and MeOC(O)YC(O)OMe and Subsequent Chopping of the Condensation Product With Formula 1a or 1d First step: 1,4-Butanediol (Formula 1a, 10.0 g, 111 mmol) was placed in a 3-neck flask and then NaH (0.111 mmol, 0.1 mol %) was added thereto to form $HO(CH_2)_4O^-Na^+$. Thereafter, dimethyl carbonate (DMC) and dimethyl phthalate (or dimethyl isophthalate or dimethyl terephthalate) were added in the amounts shown in Table 4. The DMC was added in an amount corresponding to the number of moles calculated by subtracting the number of moles of the phthalate from the number of moles corresponding to 1.57 equivalents per equivalent of the 1,4-butanediol. A mechanical stirrer was connected to one neck of the flask, a manifold attached with a vacuum line and a nitrogen line was connected to another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. The reaction was continued for a total of 3.5 h while removing volatiles at an elevated temperature of 190° C. and a reduced pressure of 570 mmHg for 0.5 h, 380 mmHg for 1 h, and 190 mmHg for 2 h. Thereafter, the reaction was allowed to proceed further at an elevated temperature of 210° C. for additional 2 h while removing volatiles under a high vacuum of 0.3 mmHg, which was maintained using a vacuum pump.

Second step: 1,4-Butanediol (Formula 1a) as a chopping agent was added to the condensation product obtained in the first step. The chopping agent was used in an amount of 15 mol % (1.50 g, 16.7 mmol), based on the diol initially added. The reaction was carried out for 3 h while slowly cooling to 150° C. from 210° C. Within 10 min from the beginning of the reaction, a remarkable reduction in the viscosity of the reaction mixture was observed. As a result of the reaction, the condensation product was chopped with the chopping agent. The experimental results are summarized in Table 4.

TABLE 4

<Experimental results obtained when condensation product of Formula 1a, DMC, and MeOC(O)YC(O)OMe was chopped with with Formula 1a or 1d (15 mol %)>

|  | —C(O)YC(O)— (mol % per 1a) | Chopping agent, $Z(OH)_2$ | Yield (%)[a] | Before chopping- $M_n$ $(M_w/M_n)$[b] | After chopping- $M_n$ $(M_w/M_n)$[b] | $T_g$ (° C.)[c] | State after 1 day | State after 7 days |
|---|---|---|---|---|---|---|---|---|
| Example 36 | Terephthalate (30 mol %) | 1a | 89 | 80900 (1.57) | 2700 (1.62) | −42 | Wax | Wax |
| Example 37 | Isophthalate (30 mol %) | 1a | 89 | 69700 (1.50) | 2500 (1.60) | −36 | Slightly suspended oil | Suspended oil |
| Example 38 | Phthalate (30 mol %) | 1a | 91 | 58600 (1.52) | 2300 (2.1) | −43 | Slightly suspended oil | Slightly suspended oil |
| Example 39 | Phthalate (30 mol %) | 1d | 89 | 83600 (1.57) | 3300 (1.70) | −27 | Slightly suspended oil | Slightly suspended oil |

[a]Value calculated from the actual mass of the obtained condensation product relative to the theoretical maximum mass of the condensation product.
[b]Value measured on the basis of polystyrene standard in THF at 40° C. by GPC.
[c]Glass transition temperature measured by DSC.

The results in Table 4 show that aliphatic polycarbonate-co-aromatic polyester macrodiols having new structures according to claims 8-10 were readily produced by chopping, which is the feature of the present invention. Particularly, the presence of the isophthalate or phthalate repeating units was confirmed to increase the possibility that the macrodiols might be produced in the form of oils.

Examples 40-60: Condensation of Formula 1a, DMC and MeOC(O)YC(O)OMe and Subsequent Chopping of the Condensation Product With One of Formulae 2a to 2d The first step of Examples 36-39 was repeated, except that the amount of dimethyl phthalate (or dimethyl isophthalate or dimethyl terephthalate) added was adjusted to the range of 10 to 50 mol %. When the phthalate was used in an amount not larger than 20 mol %, volatiles were finally removed under a high vacuum of 0.3 mmHg at 190° C. instead of at 210° C.

The second step of Examples 36-39 was repeated, except that a diol selected from Formulae 2a to 2d was used as a chopping agent. The experimental results are summarized in Table 5.

The results in Table 5 show the production of aliphatic polycarbonate-co-aromatic polyester macrodiols with various compositions. Particularly, the presence of the isophthalate or phthalate repeating unit was confirmed to increase the possibility that the macrodiols might be produced in the form of oils.

Comparative Example 1: Attempt to Directly Produce Low-Molecular-Weight Diol by Condensation of Formula 1a With DMC 1,4-Butanediol (Formula 1a, 10.0 g, 111 mmol) and NaH (0.222 mmol, 0.2 mol %) were placed in a 3-neck flask to form $HO(CH_2)_4O^-Na^+$. Thereafter, 15.3 g (170 mmol) of dimethyl carbonate (DMC) was further added. The DMC was used in a small amount compared to the amounts used in the previous examples to synthesize oligomers whose molecular weights are on the order of several thousands and whose ends are all capped with —OH. A mechanical stirrer was connected to one neck of the flask, a manifold attached with a vacuum line and a nitrogen line was connected to

TABLE 5

<Experimental results obtained when condensation product of Formula 1a, DMC, and MeOC(O)YC(O)OMe was chopped with one of Formulae 2a to 2d (15 mol %)>

| | —C(O)YC(O)— (mol % per 1a) | Chopping agent, $Z(OH)_a$ | Yield (%)[a] | Before chopping- $M_n$ $(M_w/M_n)$[b] | After chopping- $M_n$ $(M_w/M_n)$[b] | $T_g$ (° C.)[c] | State after 1 day | State after 7 days |
|---|---|---|---|---|---|---|---|---|
| Example 40 | Isophthalate (10 mol %) | 2a | 88 | 72000 (1.42) | 2400 (1.83) | −43 | Transparent oil | Transparent oil |
| Example 41 | Isophthalate (20 mol %) | 2a | 87 | 78000 (1.56) | 2600 (1.85) | −38 | Transparent oil | Transparent oil |
| Example 42 | Isophthalate (30 mol %) | 2a | 87 | 68000 (1.50) | 2600 (1.82) | −35 | Transparent oil | Transparent oil |
| Example 43 | Isophthalate (40 mol %) | 2a | 90 | 82600 (1.58) | 2400 (1.95) | −29 | Slight suspension | Suspended Oil |
| Example 44 | Isophthalate (50 mol %) | 2a | 91 | 75200 (1.56) | 2700 (1.83) | −28 | Wax | Wax |
| Example 45 | Isophthalate (30 mol %) | 2b | 89 | 107200 (1.47) | 2300 (1.73) | −28 | Transparent oil | Transparent oil |
| Example 46 | Isophthalate (30 mol %) | 2c | 86 | 80900 (1.50) | 1900 (1.65) | −44 | Brown oil | Brown oil |
| Example 47 | Isophthalate (30 mol %) | 2d | 88 | 94400 (1.39) | 2400 (1.84) | −24 | Transparent oil | Transparent oil |
| Example 48 | Terephthalate (10 mol %) | 2a | 90 | 72900 (1.38) | 2400 (1.83) | −44 | Suspended oil | Suspended oil |
| Example 49 | Terephthalate (20 mol %) | 2a | 89 | 73500 (1.39) | 2600 (1.88) | −39 | Wax | Wax |
| Example 50 | Terephthalate (30 mol %) | 2a | 91 | 118100 (1.41) | 2800 (1.97) | −35 | Wax | Wax |
| Example 51 | Terephthalate (40 mol %) | 2a | 85 | 80800 (1.49) | 2800 (1.91) | −33 | Wax | Wax |
| Example 52 | Terephthalate (50 mol %) | 2a | 87 | 78600 (1.44) | 2900 (1.87) | −33 | Wax | Wax |
| Example 53 | Terephthalate (30 mol %) | 2b | 90 | 81700 (1.53) | 3000 (2.10) | −28 | Wax | Wax |
| Example 54 | Terephthalate (30 mol %) | 2c | 89 | 102700 (1.63) | 1800 (1.70) | −49 | Brown wax | Brown wax |
| Example 55 | Terephthalate (30 mol %) | 2d | 90 | 82500 (1.44) | 2100 (1.63) | −25 | Wax | Wax |
| Example 56 | Phthalate (10 mol %) | 2a | 87 | 83000 (1.61) | 2200 (1.74) | −41 | Transparent oil | Transparent oil |
| Example 57 | Phthalate (20 mol %) | 2a | 87 | 47800 (1.60) | 2300 (1.71) | −36 | Transparent oil | Transparent oil |
| Example 58 | Phthalate (30 mol %) | 2a | 89 | 62300 (1.49) | 2500 (1.62) | −27 | Transparent oil | Transparent oil |
| Example 59 | Phthalate (30 mol %) | 2b | 85 | 71100 (1.56) | 2400 (1.74) | −29 | Transparent oil | Transparent oil |
| Example 60 | Phthalate (30 mol %) | 2d | 88 | 76400 (1.63) | 1900 (1.51) | −24 | Transparent oil | Transparent oil |

[a]Value calculated from the actual mass of the obtained condensation product relative to the theoretical maximum mass of the condensation product.
[b]Value measured on the basis of polystyrene standard in THF at 40° C. by GPC.
[c]Glass transition temperature measured by DSC.

another neck of the flask, and a distillation unit was connected to the remaining neck of the flask. After the reaction flask was immersed in a thermostatic bath at 120° C., the reaction was carried out for 1 h while distilling off formed methanol and a portion of the DMC at ambient pressure. The reaction was carried out at ambient pressure and an elevated temperature of 180° C. for another 1 h until the amount of distilled volatiles (methanol or DMC) reached a negligible level. After a 1 h reaction under a reduced pressure of 380 mmHg, the reaction mixture was sampled for $^1$H NMR analysis. As a result, the integral values corresponding to —CH$_2$OC(O)—, —OCH$_3$, and —OH were 10.1, 0.71, and 1.0, respectively. After the reaction was continued at the same pressure for additional 1 h, the integral values were changed to 11.5, 0.63, and 1.0, respectively. These results indicate that the reaction rate was very low. For more effective removal of byproducts, the reaction was allowed to proceed further under a high vacuum of 0.3 mmHg for 2 h. $^1$H NMR analysis revealed that the peaks corresponding to —OCH$_3$ groups disappeared completely and the final polymer was end-capped with —OH only. The polymer had a molecular weight ($M_n$) of 20000, which was higher than that expected. During the reaction under a reduced pressure of 380 mmHg, the ambient —OH groups were hydrogen-bonded with the alkoxy anions to weaken the nucleophilic attack of the alkoxy anions and were also hydrogen-bonded with the formed methanol to impede effective removal of the methanol. This hydrogen bonding is interpreted to be responsible for the low rate of the reaction. When the pressure was further reduced to 0.3 mmHg, the butanediol, DMC, and HO(CH$_2$)$_4$OC(O)OCH$_3$ as well as methanol were removed, and as a result, the chains were connected to each other, leading to a rapid increase in molecular weight. Therefore, the molecular weight of the polymer was confirmed to be difficult to control.

Comparative Example 2: Chopping of Low-Molecular-Weight Condensation Product With Formula 2a 10 mol % of 1,4-butanediol (Formula 1a) and the diol of Formula 1e were placed in a 3-neck flask such that the total number of moles was 111 mmol. NaH (0.056 mmol, 0.05 mol %) was added to the flask to form HO(CH$_2$)$_4$O$^-$Na$^+$ and then 14.5 g (161 mmol) of dimethyl carbonate (DMC) was added thereto. The subsequent procedure was carried out in the same manner as in Examples 22-35. In the first step, a polymer with a number average molecular weight of 5000 was obtained. Chopping of the polymer afforded a macropolyol with a number average molecular weight of 1900. The molecular weight of the polymer before chopping was on the order of about 2.5-fold higher than that of the macropolyol after chopping. The presence of a relatively large number of highly crystalline linear chains free of Z(O—)$_3$ in the macropolyol made the macropolyol waxy. The shape of the macropolyol was compared with that of a macropolyol having a number average molecular weight (Mn) at the same level. For example, the macropolyol of Example 30 (Mn=2000), which was produced by chopping the high-molecular-weight polymer (Mn=51000) prepared using the same composition in the first step with the same chopping agent (Formula 2a), was in the form of a transparent oil suitable for use in polyurethane and lubricating agents.

The invention claimed is:

1. A method for producing an aliphatic polycarbonate macropolyol, comprising:

(a) condensing HOAOH in the presence of a base catalyst and an agent comprising DMC to prepare a condensation product, wherein the condensation product is an aliphatic polycarbonate with a number average molecular weight of 10000 or higher, the condensing step comprising:

(a1) reacting the HOAOH with the agent at ambient pressure at a first temperature to form oligomers, wherein, in the oligomers, —OH and —OCH$_3$ are present in a ratio of about 1:1, and (a2) forming the condensation product from the oligomers at an elevated temperature higher than the first temperature and at a reduced pressure lower than ambient pressure; and (b) transesterifying the condensation product with Z(OH)a to form a final product, wherein the final product is an aliphatic polycarbonate with a number average molecular weight lower than that of the condensation product, wherein A is a substituted or unsubstituted C$_3$-C$_{60}$ alkylene or a combination of two or more substituted or unsubstituted C$_3$-C$_{60}$ alkylenes, wherein a is an integer from 2 to 4, provided that, when a is 2, Z is a substituted or unsubstituted C$_3$-C$_{60}$ alkanediyl, when a is 3, Z is a substituted or unsubstituted C$_3$-C$_{60}$ alkanetriyl, and when a is 4, Z is a substituted or unsubstituted C$_4$-C$_{60}$ alkanetetriyl, wherein the aliphatic polycarbonate macropolyol comprises:

—OAO— and Z(O—)$_a$ as repeating units and a linker, the linker comprising carbonyl (—C(O)—), wherein the repeating units —OAO— and Z(O—)$_a$ are linked to each other via the linker or are bonded to hydrogen to form terminal —OH groups, wherein the transesterifying step occurs in the presence of the base catalyst used in the condensing step, and wherein the number average molecular weight of the condensation product is at least 10 times higher than that of the final product.

2. The method according to claim 1, wherein the base catalyst is composed of a lithium, a sodium or potassium cation, and an alkoxy anion formed by deprotonation of the HOAOH, and wherein the base catalyst is used in an amount of 0.01 mol % to 0.1 mol %, based on the HOAOH.

3. The method according to claim 1, wherein the agent further comprises MeOC(O)YC(O)OMe, wherein Y is a substituted or unsubstituted C$_5$-C$_{20}$ arylene, a combination of two or more substituted or unsubstituted C$_5$-C$_{20}$ arylenes, a substituted or unsubstituted C$_5$-C$_{20}$ heteroarylene or a combination of two or more substituted or unsubstituted C$_5$-C$_{20}$ heteroarylenes.

4. The method according to claim 3, wherein the linker further comprises —C(O)YC(O)—.

5. The method according to claim 1, wherein the step (a2) further comprising removing of methanol.

6. The method according to claim 1, wherein the unit Z(O—)$_a$ is present in an amount of 5 to 20 mol % with respect to the unit —OAO—.

7. The method according to claim 1, wherein, in the step (a), the HOAOH is a mixture of two or more different diol compounds containing the substituted or unsubstituted C$_3$-C$_{60}$ alkylenes.

8. The method according to claim 1, wherein, in the transesterifying step, the Z(OH)$_a$ is provided in an amount of 5 to 20 mol % of the HOAOH.

9. The method according to claim 1, wherein the number average molecular weight of the condensation product is higher than 50000.

\* \* \* \* \*